Dec. 23, 1924.

L. W. SODERBERG

FOOT ACCELERATOR FOR MOTOR CARS

Filed Feb. 9, 1924

1,520,155

Inventor:
Louis W. Soderberg
By Wilson & McCanna
Attys.

Patented Dec. 23, 1924.

1,520,155

UNITED STATES PATENT OFFICE.

LOUIS W. SODERBERG, OF ROCKFORD, ILLINOIS.

FOOT ACCELERATOR FOR MOTOR CARS.

Application filed February 9, 1924. Serial No. 691,616.

*To all whom it may concern:*

Be it known that I, LOUIS W. SODERBERG, a citizen of the United States, residing at Rockford, in the county of Winnebago and State of Illinois, have invented certain new and useful Improvements in Foot Accelerators for Motor Cars, of which the following is a specification.

This invention relates to foot control accelerators for motor cars of the Ford type, in which the hand throttle is located on the steering column at the left hand side of the motor and the carburetter at the right hand side thereof. And, while my present improvements have been especially designed for attachment to Ford cars, it will be evident that they are adapted for application to other motor cars of the same type.

The primary purpose of my invention is to provide an improved foot accelerator attachment for motor cars of the type described, characterized by its few parts, simplicity in construction, and adaptation for quick and easy installation.

Another purpose is to so construct the parts that they may be applied independently of the floor board so that the latter may be removed at any time without disturbing any of the foot accelerator parts.

A further purpose is to so design the parts that they may be produced at comparatively low cost; that is, I have aimed to provide but four principal parts, three of wire or rod and the fourth a spring. The wire parts are bent to an especially advantageous shape, as will be described in detail hereinafter.

Other objects and attendant advantages will be appreciated by those skilled in this art as the invention becomes better understood by reference to the following description when considered in connection with the accompanying drawing, in which—

Figure 1:
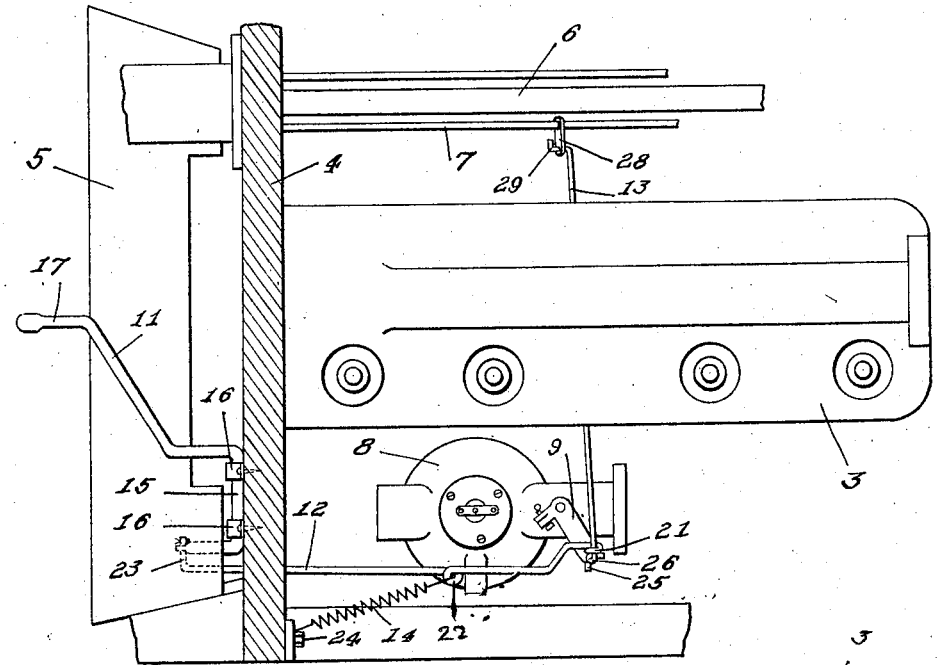
Figure 2:
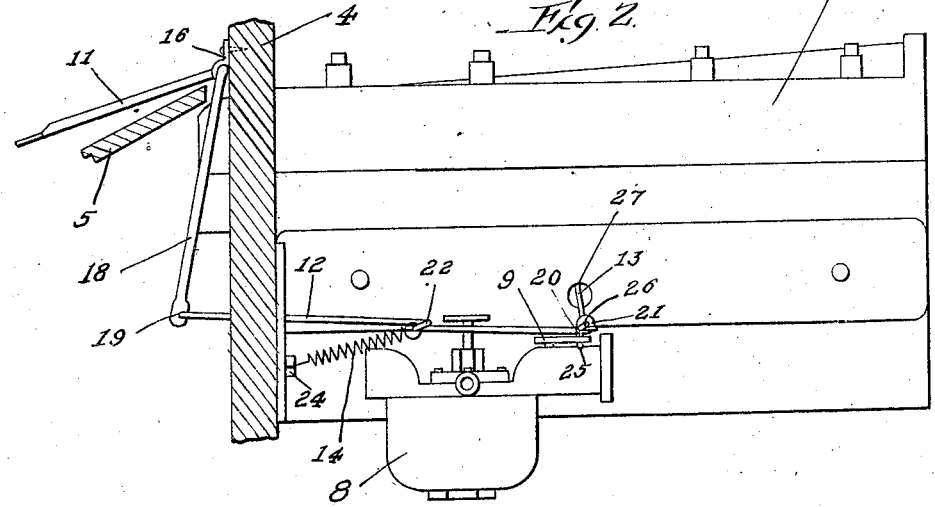

Figure 1 is a plan view, somewhat diagrammatic, of the motor end of a motor vehicle, embodying my invention; and Fig. 2 is a side elevation of certain of the parts shown in Fig. 1.

Referring more particularly to the drawing, the well known parts comprise a motor 3, dashboard 4, floor board 5, steering post 6, hand-operated throttle rod 7, carburetter 8 and the throttle valve lever 9 for the carburetter.

The four principal parts making up my improved accelerator comprise a foot lever 11, a push rod 12, a pull rod 13, and a coiled spring 14, these reference numerals being generally applied.

The foot lever is preferably in the form of a comparatively heavy wire or rod in a single piece, bent to provide a pivot portion 15 adapted to be attached to the face of the dashboard by one or more brackets 16 so as to turn on a horizontal axis, a rearwardly and laterally reaching arm 17 providing a foot-operable end, and a downwardly and rearwardly reaching arm 18 having a hole 19 in its lower end extending crosswise of the car on a horizontal axis. It will be manifest that this bell-crank foot lever is adapted to be attached to the dashboard without interference with the floor board 5, which in Ford motor cars has an opening at its forward right hand end of sufficient size to permit location and operation of the arm 18.

The push rod, preferably formed of a single piece of wire of smaller diameter than the foot lever, is bent at its forward end to provide a vertical pivot portion 20 adapted to pass through the vertical hole in the outer end of the throttle valve lever 9, a loop 21 providing a supporting bearing for the pull rod 13 and a stop therefor, and is further shaped to provide a spring-attaching part 22 intermediate its ends, preferably in the form of a loop, and a laterally turned end 23 adapted to pass through the opening 19 in the foot lever arm 18 for establishing a connection with said foot lever and the push rod and also for maintaining the push rod in proper operative relation to the throttle-valve lever 9. The spring 14 is attached at its forward end to the part 22 and at its rear end by means of a bolt 24 to a frame part, as plainly shown in the drawing. The end of the push rod passed through the hole in the throttle-valve lever 9 will be turned laterally, as indicated at 25, providing a retaining means or stop beneath the lever 9 for preventing upward displacement of the pivot portion 20.

The pull rod 13 passes through and has a bearing support in the loop 21 and is turned upon itself at one end providing a stop 26. This rod, preferably of wire smaller in diameter than the rod 12 because of the nature of its work, is before installation, straight except for the stop 26 formed at one end. The rod may be passed through the loop 21 and the opening 27 in the motor and its end remote from the stop 26 may be turned out at the proper point to pass through the hole in the small crank arm 28 fixed to the throttle rod 7. This end 29 will be bent over as plainly shown in Fig. 1, so as to establish a permanent pivotal connection with the part 28. With a construction of this kind, the length of the pull rod 13 may be easily established and no fastening means required for connecting or holding it in position at either end other than the loop 21 and the part 28.

It will be manifest from the foregoing that upon depressing the foot-operable end 17 of the foot-lever, the rod 12 will be pushed forwardly against the tension of the spring 14, thereby opening the throttle valve by a direct connection, and that during this movement the loop 21 passes freely over the rod 13. It will also be apparent that at any time the throttle rod 7 may be operated by hand to open the throttle valve, this being accomplished by the one-way connection between said rod and the looped part 21. When the hand throttle is retracted after having been advanced and when the foot pressure on the lever 11 is released, the spring 14 will return the throttle-valve lever 9 to its valve-closing position. Said spring 14 also puts a tension on the part to which it is connected, serving to prevent them from rattling.

From the foregoing, it will be manifest that the parts making up my improved foot accelerator are of such simple design and construction that they may be produced at a comparatively low cost, also that they may be installed very easily and without interference with standard parts of a Ford car. It should be understood, however, that while I have illustrated but a single working embodiment, changes might be made in details of construction without departing from the spirit and scope of the invention as expressed in the appended claims.

I claim:

1. A foot accelerator for motor cars comprising, in combination, a foot lever having a depending arm, a push rod formed of a single piece of wire bent at its rear end to provide a horizontal pivot for attachment to said depending arm, at its forward end to provide a vertical pivot for attachment to the throttle valve lever of the carburetter and a looped portion above said vertical pivot portion, a pull rod passing through said looped portion and having a stop providing a one-way connection with said push rod adapted to be operated by hand control for opening the throttle valve and permitting independent operation of the foot lever for opening said valve, and a spring acting on the push rod for urging the throttle valve lever to the closed position.

2. A foot accelerator for motor cars comprising, in combination, a foot lever adapted to be mounted on the dash and having a depending arm, a push rod attached at its rear end directly to said depending arm and at its forward end directly to the throttle valve lever of the carburetter, a spring acting on the push rod to hold said throttle valve lever in closed position, and a pull rod having a one-way connection directly with said push rod for imparting valve opening movement to said lever and permitting independent operation of the foot lever for imparting similar movement to said valve.

3. A foot accelerator for motor cars comprising, in combination, a bell-crank foot lever haing a horizontal pivot portion adapted to be attached to the dash, one arm of said lever extending rearwardly from said pivot portion providing a foot-operable end, and the other arm extending downwardly from said pivot portion and having a horizontal laterally extending opening therethrough; a push rod formed of a single piece of wire bent at its forward end to provide a loop terminating in a vertical pivot portion adapted to pass downwardly through the opening in the throttle-valve lever and laterally beneath said lever for preventing withdrawal of said pivot portion therefrom, and bent intermediate its ends to provide a spring-attaching part and at its rear end to provide a laterally turned end having a bearing in said opening in the depending arm of the foot lever for holding the push rod in operative relation to the throttle-valve lever; a pull rod passing through said loop in the push rod and adapted to be connected to the hand-operated throttle rod of the motor car and having at its opposite end, beyond said loop, a stop providing a one-way connection with said loop; and a coiled contractible spring connected to said spring-attaching part constantly urging it rearwardly to hold the push rod and connected part in the normal valve-closing position.

LOUIS W. SODERBERG.